March 29, 1938.  S. GUARNASCHELLI  2,112,238
FLEXIBLE TUBE COUPLING
Filed March 7, 1936
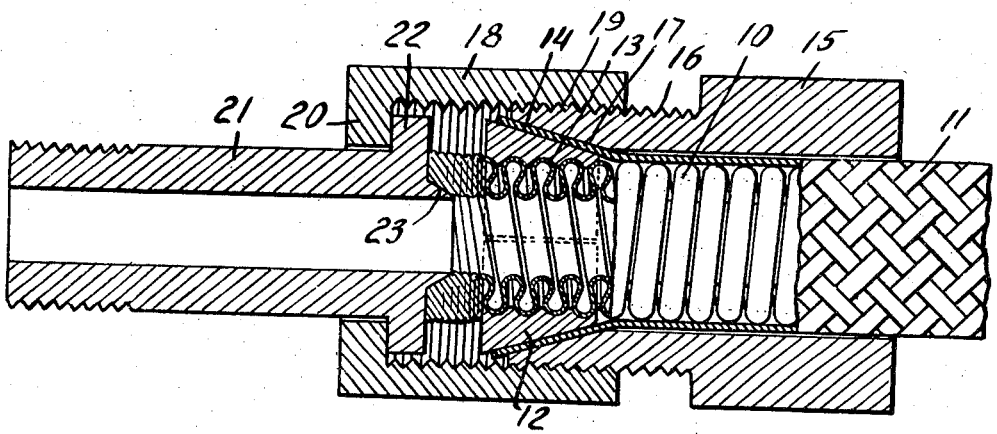
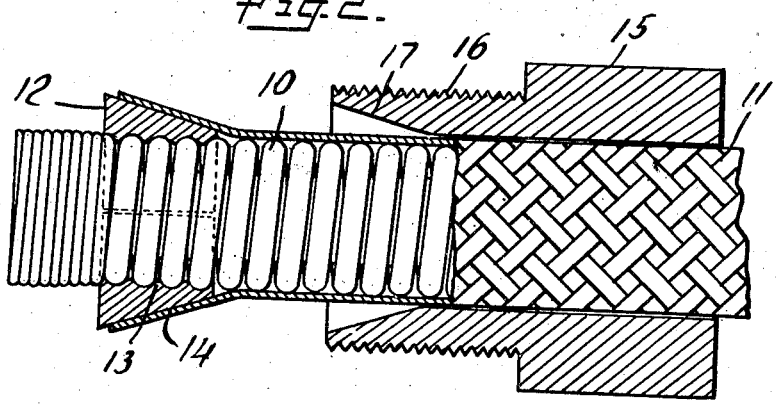
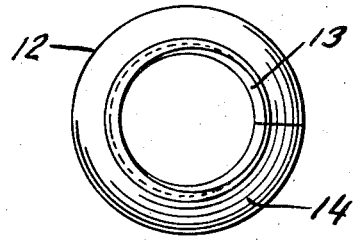
INVENTOR
Stephen Guarnaschelli
BY
Marshall & Hawley
ATTORNEYS Patented Mar. 29, 1938

2,112,238

UNITED STATES PATENT OFFICE 2,112,238

FLEXIBLE TUBE COUPLING

Stephen Guarnaschelli, Brooklyn, N. Y., assignor to Packless Metal Products Corporation, a corporation of Delaware

REISSUED
OCT 22 1940

Application March 7, 1936, Serial No. 67,623

1 Claim. (Cl. 285—72)

This invention relates to flexible tubing and particularly to seamless metallic, preferably spirally corrugated tubing and to fixtures or couplings for joining sections of such tubing and for securing a flexible sheath thereto.

The sale and use of flexible metallic tubing has been limited by the fact that it has been practically impossible to join or splice tubing in the field in case of a break. This has required the user to replace the whole length broken or to employ an expert mechanic or service man to make and seal the joint.

This invention has for its salient object to provide means for securing a flexible sheath of metal or other suitable material to a metallic tubing of the character specified, that is simple and practical in construction and can be easily applied.

Another object of the invention is to provide a leak-proof coupling for joining together pipe sections of the character specified without soldering or brazing the joint.

Another object of the invention is to provide simple, practical and effective means for forming a conical seat in the end of a corrugated metal tube.

Another object of the invention is to provide means constructed and arranged to simultaneously secure a sheath to a corrugated metal tube and form a leak-proof solderless joint on the end of the tube.

Further objects of the invention will appear from the following specification taken in connection with the drawing which forms a part of this application, and in which Fig. 1 is a longitudinal sectional elevation through a coupling and hose, the coupling being secured to the hose and being constructed in accordance with the invention;

Fig. 2 is an elevational view illustrating the preliminary step prior to the insertion of the end of the hose in the coupling; and Fig. 3 is an elevational view of the split collar which is secured around an end portion of the hose to form an abutment or fix this portion of the hose as the outer end portion is compressed.

The invention briefly described consists of a split collar having its inner surface threaded to receive the spiral corrugations on the outer surface of the hose and having a conical outer surface adapted to coact with the coupling member to cause the split collar to grip the hose and form a firm abutment as the end of the hose is compressed. The coupling comprises a pair of coupling members threaded to each other, one member having a conical inner surface corresponding to the conical outer surface of the collar and the other member having a conical abutment or projection centrally disposed therein and adapted to enter the outer end of the hose and to form a conical seat therein as the outer end is compressed when the coupling members are threaded onto each other.

Further details of the invention will appear from the following description.

In the embodiment of the invention illustrated in the drawing there is shown a flexible metallic spiral hose 10 having a sheet 11 surrounding the outer surface thereof.

A split collar 12 having an internally threaded surface 13 is arranged to be threaded on the outer end portion of the hose, the outer surface of the split collar being conical, as shown at 14.

The internal diameter of the split collar is less than the outside diameter of the hose when the collar gap between the split ends is closed. Therefore, the gap is open when the collar is threaded on or placed around the hose. The conical inner surface of the coacting coupling member, hereinafter described, causes the collar to be compressed and grip the hose.

The coupling in the form of the invention shown comprises a coupling member 15 having a threaded outer surface 16 and a conical inner surface 17, corresponding in shape to the outer surface 14 of the split collar 12.

The coupling also comprises a coupling member 18 having an internally threaded surface 19 arranged for threaded engagement with the threaded surface 16 on the coupling member 15. The member 18 also has an inwardly extending flange 20 within which is disposed a sleeve 21 having a laterally extending flange 22 adapted to abut against the inner surface of the flange 20. The member 21 also has a centrally disposed conical abutment or projection 23 having an outer diameter at the end thereof slightly less than the internal diameter of the hose so that the conical projection 23 will upon its initial movement enter the bore of the hose.

The device above described is used in the following manner: The coupling member 15 is first slipped over the end of the hose and the threaded split collar 12 is then threaded on the outer end portion of the hose to a predetermined position back of the end of the hose. The portion of the hose beyond the threaded collar is then compressed, as shown in Fig. 2, the collar having been compressed on the hose to form a firm abutment.

The sheath 11 is then moved forward over the collar 12 and the coupling member 15 is also moved forward to clamp the sheath between the coupling member and the outer conical surface 14 of the collar. The threaded member 18 is then threaded on the coupling member 15 and as these two coupling members are threaded together the conical projection 23 will enter the end of the hose and the hose will be compressed into a substantially solid mass between the collar 12 and the projection 23 and inner surface of the flange 22. This relative movement of the coupling members 15 and 18 will cause the split collar 12 to be further compressed around the hose, thus forming a firm and secure abutment to hold the hose during the compression of the end thereof.

The construction above described will form a secure, tight, leak-proof joint at the end of the hose and the seat or joint at the end is formed during the operation of the coupling thereon. No further tools or apparatus is necessary. Furthermore, should it be desired to obtain a swiveling action between the ends of the coupling, the coupling member 18 may be loosened and the sleeve 21 can be rotated therein.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claim.

What I claim is:

In combination, a flexible corrugated metallic tube, a split collar having a corrugated inner surface adapted to engage and receive the corrugations on the tube and having a tapered outer surface, the internal diameter of the split collar being less than the outside diameter of the hose when the split collar is closed, a coupling comprising a member having a conical seat having an outer diameter at the end thereof dimensioned to receive and enter the bore of the tube and having a flange at the large end of the conical seat adapted to form an abutment for the end of the tube, a second coupling member having a conical inner surface arranged to wedgingly receive the conical outer surface of the split collar to prevent expansion of the collar and longitudinal movement of the hose in the collar, and means engaging said two coupling members to draw said members toward each other, thus compressing the end portion of the tube into a compact mass and forming a conical seat at the end thereof.

STEPHEN GUARNASCHELLI.